R. LICHTENBERGER.
SPOUT FOR COOKING UTENSILS.
APPLICATION FILED FEB. 29, 1912.

1,052,673.

Patented Feb. 11, 1913.

Inventor
R. Lichtenberger.

Witnesses

By
Attorney

UNITED STATES PATENT OFFICE.

RICHARD LICHTENBERGER, OF NEW HARMONY, INDIANA.

SPOUT FOR COOKING UTENSILS.

1,052,673. Specification of Letters Patent. Patented Feb. 11, 1913.

Application filed February 29, 1912. Serial No. 680,616.

*To all whom it may concern:*

Be it known that I, RICHARD LICHTENBERGER, a citizen of the United States, residing at New Harmony, in the county of Posey and State of Indiana, have invented certain new and useful Improvements in Spouts for Cooking Utensils; and I do hereby declare the following to be a full, clear, and exact description of the invention, such as will enable others skilled in the art to which it appertains to make and use the same.

This invention has special reference to cooking utensils and more particularly to an improved spout therefor.

The primary object of the invention is to provide a removable strainer for a spout of a cooking utensil, the same being constructed in a novel manner to be securely held in position when desired and to be readily removed, whereby surplus water may be drained from food when the strainer is in position or for pouring small stuff or articles of food when the strainer is removed and also permitting the thorough cleaning of the spout to retain the same in a sanitary condition.

Figure 1:
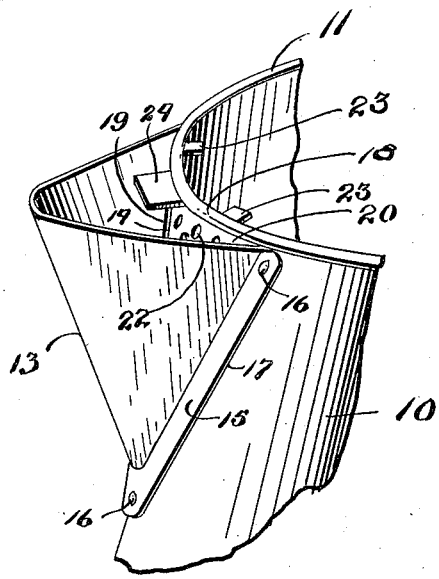
Figure 2:
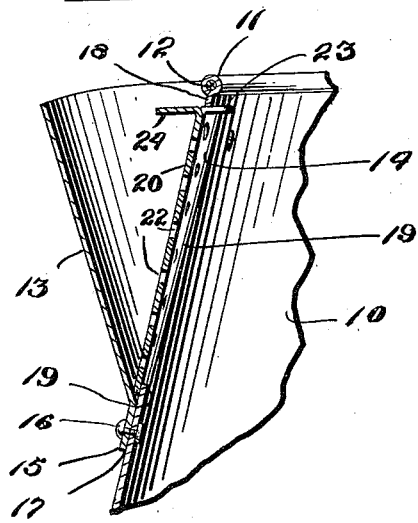
Figure 3:
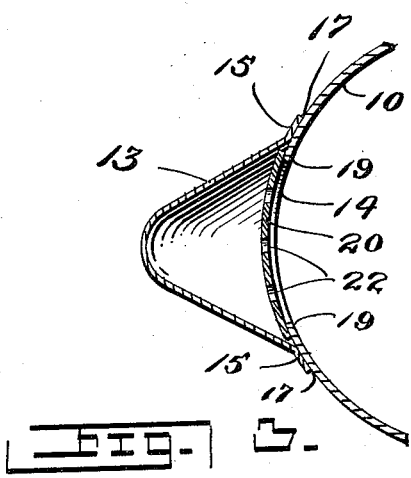
Figure 4:
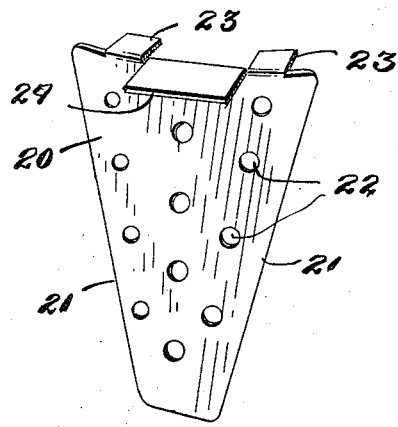

With the above and other objects in view, the invention consists of certain other combinations and arrangements of parts as will be hereinafter more fully described, claimed and illustrated in the accompanying drawings, in which:

Figure 1 is a perspective view of a portion of a cooking vessel having my improved spout structure secured thereto. Fig. 2 is a sectional view thereof vertically of the spout. Fig. 3 is a cross sectional view of the device. Fig. 4 is a perspective view of the strainer removed.

Referring more specifically to the drawings, wherein like reference characters designate similar parts throughout the several views, the numeral 10 designates the body of the cooking utensil or vessel which is preferably formed of sheet metal and has its upper edge rebent as shown at 11 and provided with a reinforcing wire 12 constituting a strengthening means for the vessel. A spout 13 is secured to the body or vessel 10 over an opening 14, the said spout having a flanged portion 15 which is suitably riveted and soldered to the said body as shown at 16 and 17 respectively so as to securely hold the spout thereto.

The opening 14 above referred to, is of substantially triangular shape, conforming to the general shape of the spout at its open side or back and said opening terminates below the beaded portion of the utensil to provide an intermediate connecting portion 18 the lower edge of which serves as a retaining means for the strainer to be hereinafter more specifically referred to.

It will be further observed that the surrounding edges of the opening in back of the spout 13 extend inwardly of the adjacent edge portions of the spout to produce guideways 19 for receiving the strainer 20 therein. This strainer is removable and comprises a section of sheet metal of substantially the same shape as the opening 14, the opposite vertical edges 21 of the strainer being adapted to tightly fit against the side portions of the spout and to slide within the guideways formed with the body of the vessel by the attaching portions of the spout, the said strainer having a plurality of perforations therethrough indicated by the numeral 22.

In order to retain the strainer 20 in position, the top edge of the strainer is formed with two rearwardly extending retaining lugs 23, the same being formed by bending portions of the metal forming the strainer rearwardly at right angles and upon opposite sides of a forwardly bent but larger projection 24 forming the handle by which the strainer may be placed in position or removed. In inserting the strainer within the spout, over the opening 14, the operator grasps the handle 24 and slides the strainer into the guideways and by slight outward pull upon the said handle, the retaining lugs can be moved past the beaded portion of the vessel whereby when the strainer is forced downwardly, said lugs will pass below the bottom edge of the connecting portion 18 and will then snap into position to prevent vertical displacement of the strainer by engagement of said lugs with the lower edge of the connecting portion.

From the foregoing description, in connection with the accompanying drawings, it will be apparent that I have provided a very simple and improved form of strainer construction used in conjunction with a spout for cooking utensils or vessels especial advantage being the fact that the strainer can be readily removed when desired not to use the same and to clean the spout to retain the same in a sanitary condition, while by means of the peculiar formation of the strainer, it will be absolutely retained in position against accidental displacement when being used and as it is constructed of a single section of metal including the retaining means, it follows that the device can be economically produced.

I claim:

1. The combination with a cooking vessel having an opening therein and a connecting portion above said opening; of a spout connected to the vessel and forming guideways with the vessel at the sides of the opening and a plate comprising a single section of metal removably engaged in the guideways and having its upper end formed with spaced inwardly bent edge lugs to spring beneath said connecting portion and hold the plate in position and an intermediate portion bent outwardly to attach and remove the plate.

2. The combination with the body of a utensil having an opening therethrough spaced from its upper edge to provide a connecting portion, and a spout secured to the utensil around said opening and outwardly of the edge walls thereof to provide opposite guideways; of a strainer removably engaged in the guideways and comprising a perforate section of metal tapering from its upper to its lower edge and conforming to the contour of the utensil, the upper edge of the strainer being provided with an extension having spaced cuts providing side lugs bent rearwardly to spring beneath said connecting portion to retain the strainer against displacement and an intermediate portion bent forwardly within the area of the spout to provide a handle.

In testimony whereof, I affix my signature, in presence of two witnesses.

RICHARD LICHTENBERGER.

Witnesses:
 PETER W. LICHTENBERGER,
 CLYDE W. WILSON.

Copies of this patent may be obtained for five cents each, by addressing the "Commissioner of Patents, Washington, D. C."